(12) United States Patent
Takahashi

(10) Patent No.: US 7,319,526 B2
(45) Date of Patent: Jan. 15, 2008

(54) APPARATUS FOR DETECTING DISPLACEMENT

(75) Inventor: Tomotaka Takahashi, Kawasaki (JP)

(73) Assignee: Mitutoyo Corporation, Kawasaki (JP)

(*) Notice: Subject to any disclaimer, the term of this patent is extended or adjusted under 35 U.S.C. 154(b) by 473 days.

(21) Appl. No.: 10/983,639

(22) Filed: Nov. 9, 2004

(65) Prior Publication Data

US 2005/0140985 A1    Jun. 30, 2005

(30) Foreign Application Priority Data

Nov. 14, 2003   (JP) ............................. 2003-385055

(51) Int. Cl.
    *G01B 11/02*   (2006.01)
(52) U.S. Cl. .................................... 356/499
(58) Field of Classification Search ................ 356/494, 356/488, 499; 250/231.16, 231.14
    See application file for complete search history.

(56) References Cited

U.S. PATENT DOCUMENTS 5,214,280 A * 5/1993 Rieder et al. ........... 250/237 G 5,696,373 A  12/1997 Fukui et al.

FOREIGN PATENT DOCUMENTS

| EP | 0 672 891 A1 | 9/1995 |
| JP | 06194190 A * | 7/1994 |
| JP | A 2002-372407 | 12/2002 |

* cited by examiner

*Primary Examiner*—Tarifur Chowdhury
*Assistant Examiner*—Jonathon D Cook
(74) *Attorney, Agent, or Firm*—Oliff & Berridge, PLC

(57) ABSTRACT

A displacement detection apparatus (100) includes a main scale (110) and a detection head (120). The detection head (120) includes a light emission/reception unit (130) and an optical device unit (140). The optical device unit (140) has a first diffraction scale (141) and a second diffraction scale (143). The first diffraction scale (141) has a transmission type first diffraction grating (142). The second diffraction scale (143) has a diffraction grating. The second diffraction scale (143) has a transmission type second diffraction grating (144) on both sides of a metal film (146). Furthermore, the metal film (146) configures a reflection type third diffraction grating (145) when the second diffraction scale (143) is viewed from the side of the main scale (110).

7 Claims, 11 Drawing Sheets

APPARATUS FOR DETECTING DISPLACEMENT

BACKGROUND OF THE INVENTION

1. Field of the Invention

The present invention relates to an apparatus for detecting displacement, for example, to an apparatus for detecting displacement of laser interference type.

2. Description of Related Art

Conventionally, there is known an apparatus for detecting displacement of laser interference type. FIG. 11 shows a conventional laser interference type displacement detection apparatus 100 that includes a main scale 110, and a detection head 120. The main scale 110 has a reflection type diffraction grating 111 along the longitudinal direction thereof or the length measurement direction. The detection head 120 has a light emission/reception unit 130, and an optical device unit 600.

The light emission/reception unit 130 has a light source 131 for emitting a laser light, and a light reception unit 134 for receiving an interfering light reflected by the main scale 110.

The optical device unit 600 has a beam splitter 601 for splitting a light from the light source 131, a first mirror 602 for reflecting one of lights split by the beam splitter 601 toward the main scale 110, a second mirror 603 and a third mirror 604 for reflecting the other of lights split by the beam splitter 601 toward the main scale 110, a fourth mirror 605 for reflecting one of diffracted lights reflected by the main scale 110 toward a half mirror 607, and a fifth mirror 606 for reflecting the other of diffracted lights reflected by the main scale 110 toward the half mirror 607.

In this configuration, a light emitted from the light source 131 is split by the beam splitter 601, and thus split lights are diffracted by the main scale 110. The lights diffracted by the main scale 110 interfere after passing through the half mirror 607, and the interfering light is received by the light reception unit 134. When the main scale 110 is displaced, brightness of the interfering light varies. Thus, displacement of the main scale 110 can be detected from the variation of the brightness. Since a light is split into two, and the split lights diffracted by the main scale 110 are made to interfere, the direction of displacement of the main scale 110 can be detected.

In splitting and reflecting a light, a diffraction grating may be used. A diffraction grating is arranged instead of a beam splitter and mirrors (for example, see Japanese Patent Laid-Open Publication No. 2002-372407).

When splitting a light from the light source 131, reflecting and diffracting thus split lights using the main scale 110, and making thus diffracted lights interfere, many optical components such as the beam splitter 601, mirrors 602 to 606, etc. are required. Furthermore, it takes a lot of trouble to adjust the arrangement and optical axes of the mirrors 601 to 606, etc.

When many optical components are arranged, the apparatus is enlarged and also optical paths are elongated. Since interference of a laser light varies due to variation of atmospheric density, elongated optical paths may lower detection accuracy.

In the case of using a diffraction grating instead of a beam splitter and mirrors, diffracted lights reflected by the main scale have to be return to the main scale so as to increase the number of reflection times to improve detection resolution, therefore reflection mirrors have to be prepared. Therefore, it is impossible to satisfy both of improving detection resolution and reducing the number of optical components to shorten optical paths, concurrently.

SUMMARY OF THE INVENTION

It is an object of the present invention to provide an apparatus for detecting displacement that can improve detection resolution as well as environmental resistance.

The displacement detection apparatus of the present invention comprises: a main scale having a diffraction grating, and a detection head that can relatively shift against the main scale and detects a relative shift amount against the main scale, wherein the detection head further comprises: a light emission/reception unit that has a light source for emitting a coherent light, and photodetectors for receiving lights diffracted by the main scale, a diffraction grating for splitting light for diffracting a light from the light source to split the light into at least two diffracted lights of different orders, a diffraction grating for deflecting light for diffracting and deflecting lights diffracted by the diffraction grating for splitting light to make the lights fall on a spot on the main scale, a diffraction grating for reemitting light for reflecting and diffracting diffracted lights from the spot on the main scale to reemit the lights on a spot on the main scale, and a multiplexing section for multiplexing diffracted lights reemitted to and diffracted by the main scale to make thus multiplexed light interfere.

In the above arrangement, coherent light (laser, for example) is emitted from the light source. The light is split by the diffraction grating for splitting light into, for example, two light-beams. The split lights are deflected by the diffraction grating for deflecting light. The lights deflected by the diffraction grating for deflecting light are emitted to the diffraction grating of the main scale to be diffracted by the main scale.

The lights diffracted by the main scale are reflected and diffracted by diffraction grating for reemitting light to be reemitted onto the main scale. The lights reemitted are diffracted again by the main scale, and then the reemitted lights are multiplexed by the multiplexing section to become interference light. The interference light is received by photodetectors. The amount of relative displacement between the main scale and the detection head is detected based on signal output from the photodetector corresponding to the change of the interference light.

According to the above arrangement, the light emitted from the diffraction grating for deflecting light onto the main scale is reflected by the diffraction grating for reemitting light to be returned to the main scale, and therefore the light is diffracted twice by the main scale. Accordingly, the lights to be received by the photodetectors have quadruple phase information as compared with lights diffracted by the main scale once. As a result, by using interfering sinusoidal wave signals output from the photodetectors, displacement of the main scale can be detected with quadruple resolution. Further, in the case where the light is split by the diffraction grating for splitting light along the direction of the relative movement between the main scale and the detector head, the lights diffracted from the main scale indicate the phase changes which are opposite to each other depending on the shift direction of the main scale. Thereby information of shift direction of the main scale can be obtained from lights received by the photodetectors.

When splitting a light into two lights and returning lights to the main scale, plural optical devices provided with the function of beam splitting and mirroring are required. On the other hand, in the case where such function is achieved by using diffraction grating, the number of optical devices can be reduced, and thereby the component cost as well as assembly cost can be reduced. Furthermore, since the number of optical devices is small, the adjustment of the optical paths becomes easy, and thereby the detection errors caused by the failure in optical path adjustment are reduced, so that the detection accuracy is improved. Further, since the components can be reduced by using diffraction grating, the entire configuration can be downsized. Consequently, the entire optical paths can be shortened. For example, since interfering wave of a laser light fluctuates due to variation of atmospheric density, the displacement detection apparatus becomes excellent in environmental resistance by shortening the optical paths.

Here, it is preferred that the diffraction grating for deflecting light, the diffraction grating for deflecting light, the diffraction grating for reemitting light and the diffraction grating of main scale have a configuration in which the diffracted light of a specific order is especially strongly diffracted. For example, in the case of diffraction grating for splitting light, a configuration in which the light from the light source is diffracted to be split into two light-beams will be preferred.

In the above arrangement, the specific interference order based on the formula of diffraction condition is mutually strengthened. For example, in the case where the diffraction grating has the concavo-convex relief on the surface thereof, the height of the diffraction grating is made to be 1/n (n is a positive integer) of the wavelength of the light, or a blazed diffraction grating may be used; while in the case where the diffraction grating has cyclically changing optical density, the length of the cycle of the changing may be predetermined.

Further, in the displacement detection apparatus of the present invention, it is preferred that the detection head has a first diffraction scale provided with the transmission type diffraction grating, which is arranged between the light emission/reception unit and the diffraction grating for deflecting light, and the diffraction grating for splitting light is configured as a light from the light source is split by the first diffraction scale, while the multiplexing section is configured as diffracted lights from the main scale are multiplexed by the first diffraction scale.

According to the above arrangement, since only one diffraction grating is needed to split one light-beam into two light-beams and to multiplex the two light-beams, the number of the components can be reduced, and thereby the entire configuration can be downsized. Consequently, since the entire optical paths can be shortened, the displacement detection apparatus becomes excellent in environmental resistance. Further, since the components can be reduced, the cost for components as well as assembly can be reduced, and thereby the detection accuracy can be improved with lower cost.

Further, in the displacement detection apparatus of the present invention, it is preferred that the detection head has a transmission type second diffraction scale into one surface thereof lights from the diffraction grating for splitting light come, and from the other surface thereof transmitted and diffracted lights go out toward the main scale, the diffraction grating for deflecting light has a diffraction grating arranged on one surface of the second diffraction scale, and the diffraction grating for reemitting light has a reflection section that is arranged on one surface of the second diffraction scale to cover part of the diffraction grating, and reflects lights coming from the side of the other surface of the second diffraction scale.

According to the above arrangement, due to the function of the diffraction grating arranged on one surface of the second diffraction scale, when the light emitted from the other surface of the second diffraction scale is reflected by the reflection section, the light is also diffracted.

Since the diffraction grating for reemitting light is formed by arranging a reflection section to the second diffraction scale, not only the diffraction grating for reemitting light is simply formed, but the number of the components is reduced because the diffraction grating for reemitting light is integrally arranged to the second diffraction scale. Although some cost will be needed for separately forming the diffraction grating, by using the simple method of arranging a reflection section on the second diffraction scale, a reflection-type diffraction grating having high accuracy can be achieved.

Herein, the diffraction grating for reemitting light also can be arranged on the other surface of the second diffraction scale. Namely, the detection head has a transmission type second diffraction scale into one surface thereof the lights from the diffraction grating for splitting light are emitted, and from the other surface thereof transmitted and diffracted lights are emitted toward the main scale. The diffraction grating for deflecting light is composed of the diffraction grating arranged on the one surface of the second diffraction scale, and the diffraction grating for reemitting light is composed of a reflection section that is arranged on the other surface of the second diffraction scale to cover part of the diffraction grating, and reflects lights coming from the side of the other surface of the second diffraction scale. However, in such arrangement, the surface of the reflection section needed to be formed with a concavo-convex relief as a diffraction grating.

Incidentally, the diffraction grating for reemitting light is not necessarily to be arranged to the second diffraction scale along with the diffraction grating for deflecting light, a reflection-type diffraction grating as a diffraction grating for reemitting light can be separately arranged.

Further, in the displacement detection apparatus of the present invention, it is preferred that the main scale has a reflection type diffraction grating, the detection head has a diffraction scale provided with a transmission type diffraction grating on both sides thereof, which is arranged between the light emission/reception unit and the main scale, the diffraction grating for splitting light is configured as a light coming from the light source is split by the diffraction grating of the diffraction scale arranged on the side of the light emission/reception unit, while the multiplexing section is configured as diffracted lights from the main scale are multiplexed, the diffraction grating for deflecting light is a diffraction grating of the second diffraction scale arranged on the side of the main scale, and the diffraction grating for reemitting light has a reflection type diffraction grating that is so arranged as to cover part of the diffraction scale on the side of the main scale to reflect and diffract the reflected and diffracted lights from the main scale to the main scale.

According to the above arrangement, since the diffraction grating for splitting light, the multiplexing section, the diffraction grating for deflecting light, and the diffraction grating for light the diffraction grating for reemitting light are integrally arranged on one single diffraction scale, the number of optical components can be extremely reduced. Accordingly, the component cost as well as assembly cost can be reduced. Further, the adjustment of the optical paths at the time of assembly is very simplified. Furthermore, since the number of optical components can be extremely reduced, the entire optical paths can be extremely shortened.

Accordingly, the displacement detection apparatus becomes excellent in environmental resistance.

Further, in the displacement detection apparatus of the present invention, it is preferred that the main scale has the reflection type diffraction grating, and the diffraction grating for reemitting light reflects and diffracts the reflected and diffracted lights from the main scale twice or more together with the main scale to reemit thus reflected and diffracted lights.

In the above arrangement, since the number of times to reemit the lights onto the main scale by the diffraction grating for reemitting light is increased, the lights to be received by the photodetectors have several fold phase information as compared with lights that are reflected and diffracted by the main scale once. As a result, resolution in detecting the relative shift amount of the main scale can be improved.

As a configuration in which the reflected and diffracted lights from the main scale is reflected and diffracted to reemit twice or more between the diffraction grating for reemitting light and the main scale, for example, the width of the diffraction grating for reemitting light can be made wide to obtain a large reflection surface, so that the reflected light from the main scale is reflected by the diffraction grating for reemitting light multiple times.

Further, in the displacement detection apparatus of the present invention, it is preferred that, in the detection head, the longitudinal directions of the light emission/reception unit, diffraction grating for splitting light, diffraction grating for deflecting light, and diffraction grating for reemitting light are arranged along the longitudinal direction of the main scale, and an optical refracting section for refracting lights deflected by the diffraction grating for deflecting light toward the center line of the main scale along the longitudinal direction thereof is arranged between the diffraction grating for deflecting light and the main scale.

According to the above arrangement, the light can be refracted by the optical refracting section toward the center line of the main scale. For example, even if the light emitted to the optical refracting section from the light source is substantially perpendicular to the main scale, the light emitted from the optical refracting section can be emitted onto the main scale after being refracted. Accordingly, since the diffracted light from the main scale has an angle relative to the light emitted to the main scale, the diffracted light from the main scale can be emitted onto the diffraction grating for reemitting light along a path different to that of the light emitted to the main scale, and further, the diffracted light from the main scale can be emitted onto the photodetectors.

If the light source emits a light along substantially vertical direction, the width of the diffraction grating for splitting light and the diffraction grating for deflecting light can be narrowed to approximately the length of the beam diameter of the laser light, which can reduce the length of the displacement detection apparatus along the width direction. Since the length along the width direction is reduced, the displacement detection apparatus can be downsized and the entire optical paths can be shortened. As a result, the displacement detection apparatus becomes excellent in environmental resistance.

Herein, the optical refracting section may be a prism, a lens or the like which refracts light.

Further, in the displacement detection apparatus of the present invention, it is preferred that the detection head has a reflection member for reflecting a light multiplexed by the multiplexing section toward the side of the light source, and in the light emission/reception unit, the light source and the photodetectors are arranged on the same side against a reflection surface of the reflection member.

In the above arrangement, the light multiplexed by the multiplexing section is reflected by the reflection surface of the reflection member toward the same side of the light source, and in the case that the reflected light is received by the photodetectors, the photodetectors are arranged on the same side of the light source. Since the electrical components such as light source and photodetectors are arranged closed to each other on the same side, electric wire can be easily gathered, thereby the wiring can be simplified.

Herein, the reflection surface of the reflection member may be arranged in parallel with a plane perpendicular to the measurement direction of the main scale, or be arranged in parallel with a plane containing the measurement direction and perpendicular to the main scale.

Incidentally, it is preferred that the light source and the photodetectors are arranged on the same side, and it is further preferred that the light source and the photodetectors are arranged in one place.

DETAILED DESCRIPTION OF PREFERRED EMBODIMENTS

Embodiments of the present invention will be described below with reference to the accompanying drawings.

First Embodiment

The first embodiment of the apparatus for detecting displacement according to the present invention will be explained.

Figure 1:
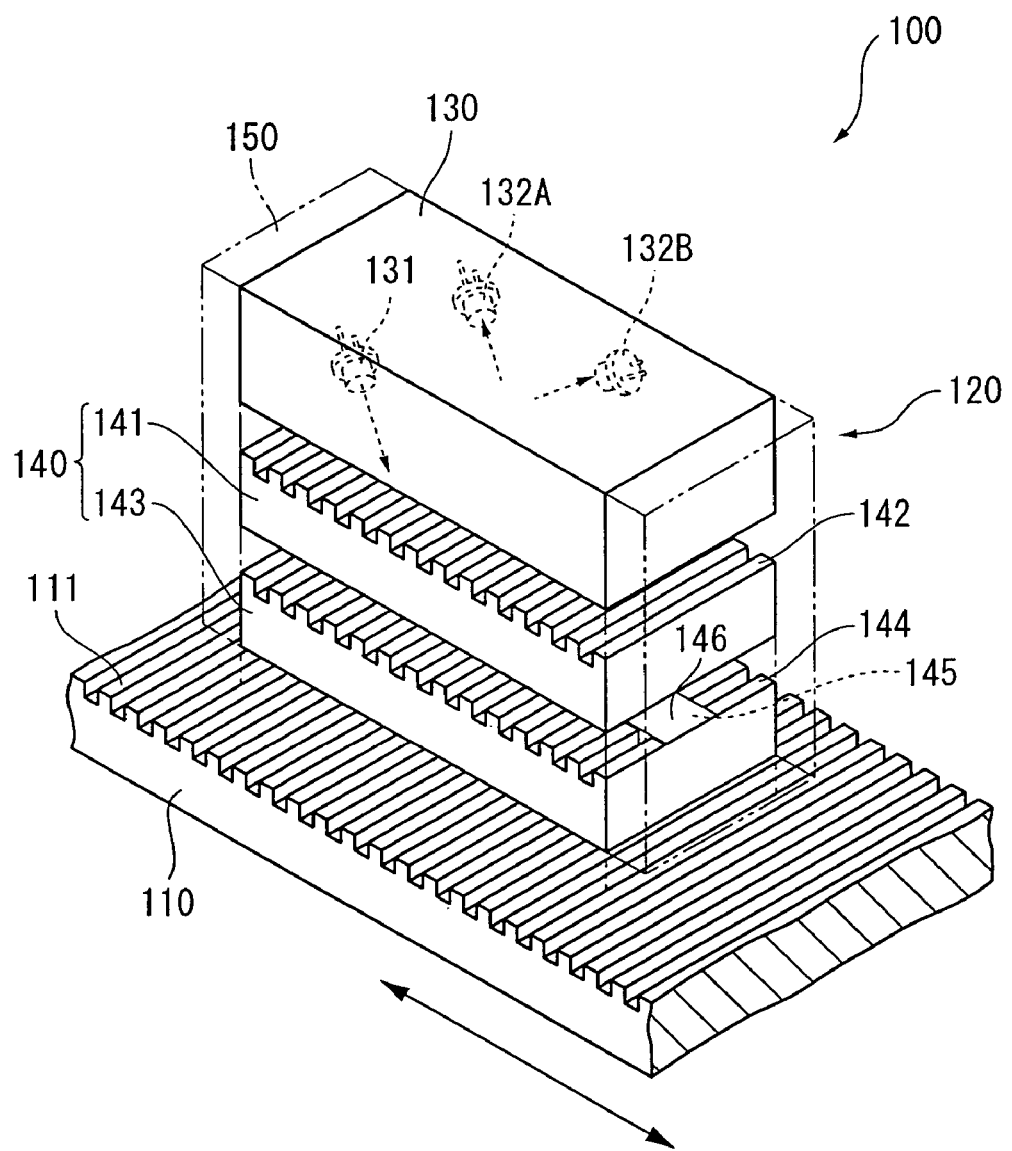
FIG. 1 shows a perspective view of the inner configuration of a displacement detection apparatus according to the first embodiment of the present invention.
Figure 2:
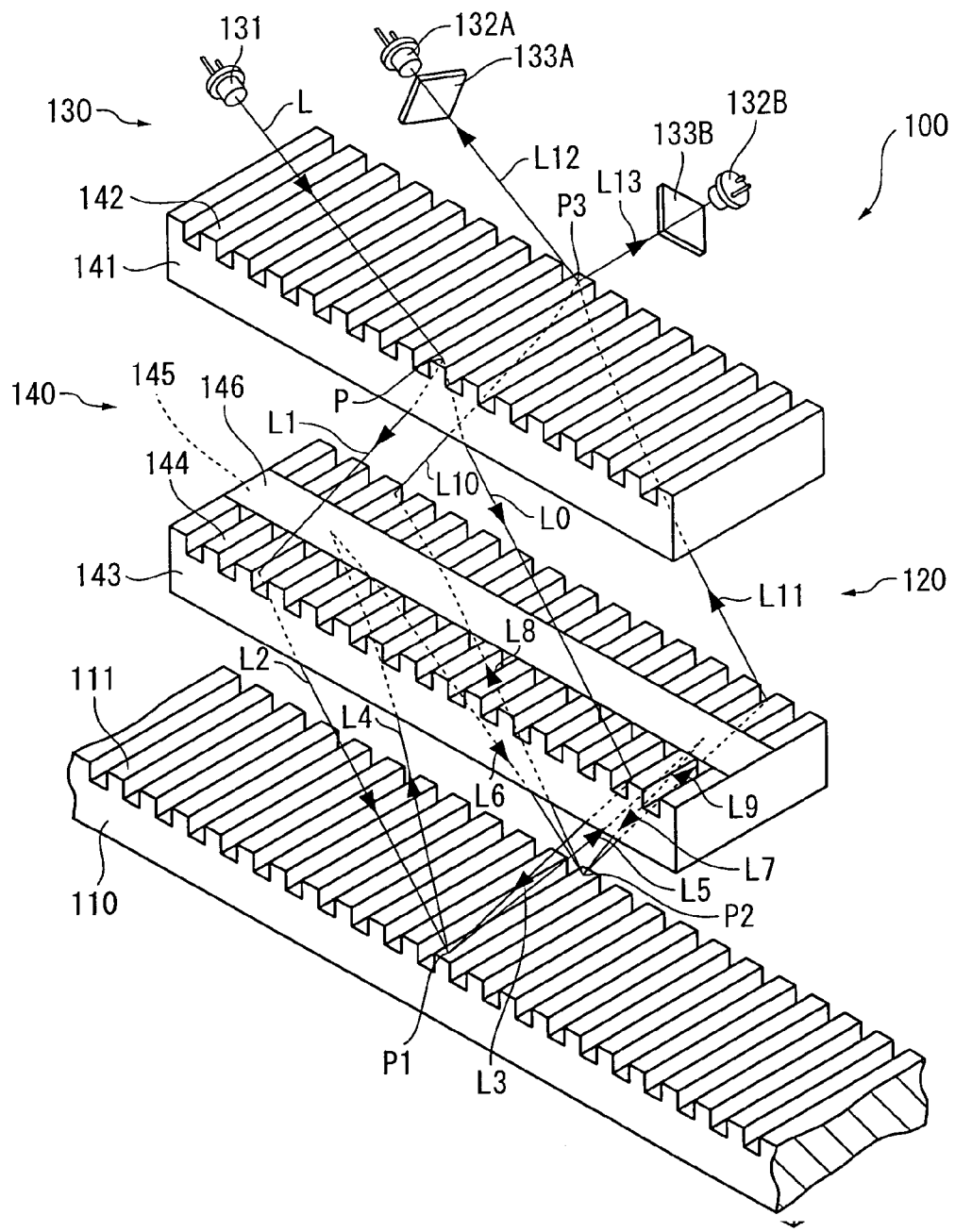
FIG. 2 shows a perspective view of the basic configuration of the displacement detection apparatus of the first embodiment and optical paths therein.

FIG. 1 shows a perspective view of the inner configuration of a displacement detection apparatus 100. FIG. 2 shows the basic configuration of the displacement detection apparatus 100 and optical paths therein.

The displacement detection apparatus 100 includes a main scale 110 and a detection head 120.

The main scale 110 is slidably arranged along the longitudinal direction thereof or the length measurement direction. The main scale 110 has, on one surface facing the detection head 120, a reflection type diffraction grating 111 arranged along the longitudinal direction thereof.

The detection head 120 emits a light to the main scale 110, and receives the light reflected by the main scale 110. Then, a relative shift amount between the main scale 110 and the detection head 120 is detected based on phase information of the reflected light.

The detection head 120 includes a light emission/reception unit 130, an optical device unit 140, and a frame 150.

The light emission/reception unit 130 emits a light that goes to the main scale 110 through the optical device unit 140, and receives the reflected light coming from the main scale 110 through the optical device unit 140.

The light emission/reception unit 130 has a light source 131, photodetectors 132A, 132B, and retardation films 133A, 133B.

The light source 131 is a laser light source that emits a coherent laser light. The manner of emitting a laser light from the light source 131 will be explained later with reference to FIG. 2, FIG. 3 and FIG. 4.

The photodetectors 132A, 132B are elements that receive the reflected light from the main scale 110 and perform photoelectric conversation for thus received light to generate an interfering sinusoidal wave signal. As the elements, two of the photodetector 132A and photodetector 132B are arranged, and two lights are received by the photodetectors among lights reflected toward the light emission/reception unit 130.

The retardation films 133A, 133B are arranged in front of the photodetectors 132A, 132B, respectively, and bring about phase difference of 90 degrees in lights which are to come into the photodetectors 132A, 132B.

The optical device unit 140 is arranged between the light emission/reception unit 130 and the main scale 110 for splitting, multiplexing and reflecting lights. The optical device unit 140 is fixedly arranged with respect to the light emission/reception unit 130, and relatively moves with respect to the main scale 110 together with the light emission/reception unit 130.

The optical device unit 140 has a first diffraction scale 141 and a second diffraction scale 143.

The first diffraction scale 141 is arranged between the light emission/reception unit 130 and the main scale 110, and is arranged on the side of the light emission/reception unit 130 in parallel with the main scale 110. The first diffraction scale 141 is of flat rectangular solid shape and is made of transparent material such as glass, etc. The first diffraction scale 141 has a transmission type first diffraction grating (diffraction grating for splitting light, multiplexing section) 142 which is arranged along the same direction as that of the diffraction grating 111 of the main scale 110. That is, the first diffraction grating 142 is a phase grating having grooves with a predetermined pitch formed on one surface of the first diffraction scale 141 facing the light emission/reception unit 130. The first diffraction grating 142 is so formed as to have a grating height that intensively diffracts lights of predetermined orders.

The second diffraction scale 143 is arranged between the light emission/reception unit 130 and the main scale 110, and is arranged on the side of the main scale 110 in parallel with the main scale 110.

The second diffraction scale 143 is made of transparent material such as glass, etc. The second diffraction scale 143 has a diffraction grating having grooves with a predetermined pitch formed on one surface thereof facing the light emission/reception unit 130, which is arranged along the same direction as that of the diffraction grating 111 of the main scale 110. The diffraction grating is so formed as to have a grating height which intensively diffracts lights of predetermined orders.

The second diffraction scale 143 has its one surface, facing the light emission/reception unit 130, metalized with a metal film (reflection section) 146 extending along the longitudinal direction at its center portion along the width direction. The metal film 146 accounts for a third part of the second diffraction scale 143 along the width direction.

The second diffraction scale 143 has a transmission type second diffraction grating (diffraction grating for deflecting light) 144 on both sides of the metal film 146. Furthermore, the metal film 146 configures a reflection type third diffraction grating (diffraction grating for reemitting light) 145 when the second diffraction scale 143 is viewed from the side of the main scale 110.

The light emission/reception unit 130 and the optical device unit 140 are housed in the frame 150 to configure the detection head 120.

Next, referring to FIG. 2, FIG. 3 and FIG. 4, optical paths of a light that is emitted from the light source 131, reflected by the main scale 110, and made to come into the photodetectors 132A, 132B will be explained.

FIG. 2 shows a perspective view of the basic configuration of the displacement detection apparatus 100 and three-dimensional optical paths therein. FIG. 3 shows a front view of the displacement detection apparatus 100 when viewed from the direction perpendicular to the measurement direction and optical paths therein. FIG. 4 shows a side view of the displacement detection apparatus 100 when viewed from the measurement direction and optical paths therein.

Firstly, a laser light L is emitted from the light source 131 toward the optical device unit 140.

Figure 3:
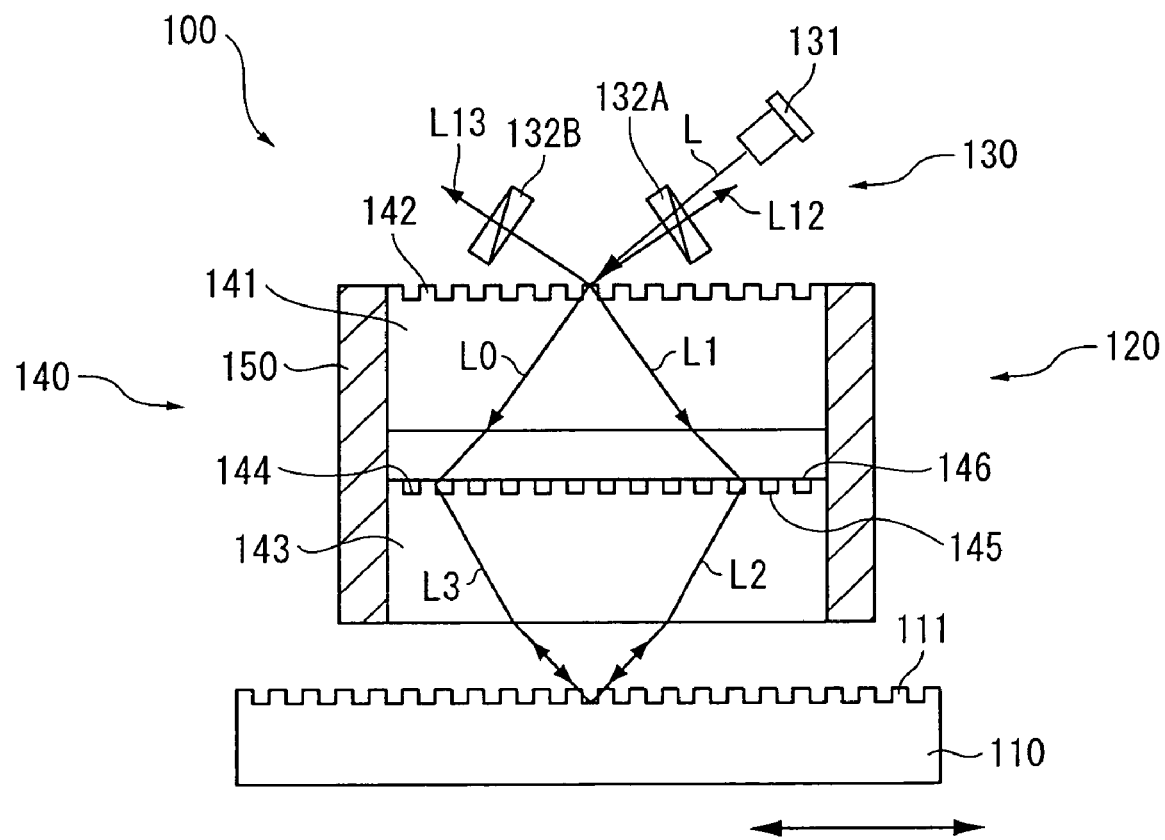
FIG. 3 shows a front view of the displacement detection apparatus of the first embodiment when viewed from the direction perpendicular to the measurement direction and optical paths therein.
Figure 4:
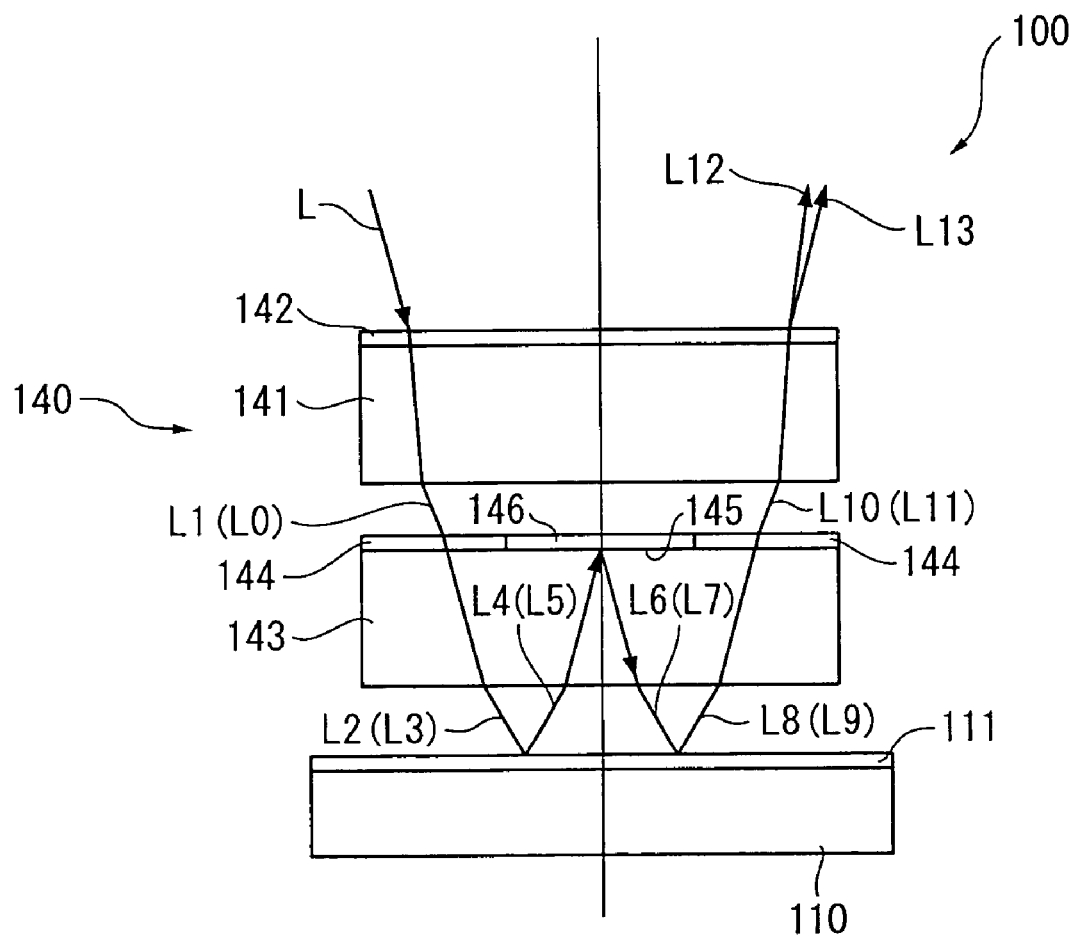
FIG. 4 shows a side view of the displacement detection apparatus of the first embodiment when viewed from the measurement direction and optical paths therein.

At this time, as shown in FIG. 3, when viewed from the direction perpendicular to the measurement direction of the main scale 110, the emission direction of the laser light L is inclined against a vertical surface along the width direction of the main scale 110. Furthermore, as shown in FIG. 4, when viewed from the measurement direction of the main scale 110, the emission direction of the laser light L is also inclined against a vertical surface along the longitudinal direction of the main scale 110. As shown in FIG. 2 and FIG. 4, the laser light L is emitted to a point P which is located near one side of the first diffraction scale 141 away from its center along the width direction.

The laser light L emitted from the light source 131 comes into the first diffraction scale 141, and is diffracted by the first diffraction grating 142 and made to go out as diffracted lights.

At this time, plural diffracted lights are generated by the first diffraction grating 142. On the other hand, since the zero-order diffracted light L0 and the minus first-order diffracted light L1 are used for detection, the zero-order diffracted light L0 and the minus first-order diffracted light L1 alone are shown in FIG. 2 and FIG. 4. Accordingly, the laser light L is split into the zero-order diffracted light L0 and the minus first-order diffracted light L1 by the first diffraction grating 142.

In the following explanation, the zero-order diffracted light is referred to as a transmitted light, while the minus first-order diffracted light is referred to as a first-order diffracted light.

The first-order diffracted light L1 and the transmitted light L0 diffracted by the first diffraction grating 142 come into the second diffraction grating 144 of the second diffraction scale 143, and are made to go out as diffracted lights. Among diffracted lights, the first-order diffracted light alone is used for detection. The first-order diffracted light L2, corresponding to the first-order diffracted light L1 going out from the first diffraction grating 142, is made to go out from the second diffraction grating 144, while the first-order diffracted light 13, corresponding to the transmitted light L0 going out from the first diffraction grating 142, is made to go out from the second diffraction grating 144. In this way, the first-order diffracted light L1 and the transmitted light L0 are so deflected as to fall on a spot on the main scale 110 by the second diffraction grating 144.

The first-order diffracted light L2 and the first-order diffracted light 13 coming from the second diffraction grating 144 is made to fall on the main scale 110. At this time, the first-order diffracted light L2 and the first-order diffracted light L3 fall on a point P1 on the main scale 110. When reflected by the reflection type diffraction grating 111 of the main scale 110, the first-order diffracted light L2 and the first-order diffracted light L3 are diffracted, and a diffracted light LA and a diffracted light L5 go out from the point P1 as reflected and diffracted lights of the first-order diffracted light L2 and the first-order diffracted light L3. At this time, a diffracted light that is reflected toward the same side as the incidence direction of the first-order diffracted light L2 coming from the second diffraction grating 144 is referred to as the diffracted light L4, while a diffracted light that is reflected toward the same side as the incidence direction of the first-order diffracted light L3 coming from the second diffraction grating 144 is referred to as the diffracted light L5.

The diffracted light L4 and the diffracted light L5 reflected by the main scale 110 come into the third diffraction grating 145 of the second diffraction scale 143. When reflected by the reflection type third diffraction grating 145, the diffracted light IA and the diffracted light L5 coming from the main scale 110 are diffracted. That is, the diffracted light L4 and the diffracted light L5 coming from the main scale 110 are reflected by the third diffraction grating 145 to be returned toward the main scale 110 as a diffracted light L6 and a diffracted light L7. At this time, the diffracted light L6 and the diffracted light L7 coming from the third diffraction grating 145 are made to fall on a point P2 on the main scale 110.

When reflected by the diffraction grating 111 of the main scale 110 at the point P2, the diffracted light L6 and the diffracted light L7 coming from the third diffraction grating 145 are diffracted, and come into the second diffraction grating 144 of the second diffraction scale 143 as a diffracted light L8 and a diffracted light L9.

At this time, a diffracted light that is reflected toward the same side as the incidence direction of the diffracted light L6 coming from the third diffraction grating 145 is referred to as the diffracted light L8, while a diffracted light that is reflected toward the same side as the incidence direction of the diffracted light L7 coming from the third diffraction grating 145 is referred to as the diffracted light L9.

The diffracted light L8 and the diffracted light L9 coming from the main scale 110 are diffracted by the second diffraction grating 144, and the first-order diffracted light L10 corresponding to the diffracted light L8 goes out, while the first-order diffracted light L11 corresponding to the diffracted light L9 goes out. Thus, the diffracted light L8 and the diffracted light L9 are so deflected as to fall on a spot on the first diffraction scale 141 by the second diffraction grating 144.

The first-order diffracted light L10 and the first-order diffracted light L11 coming from the second diffraction grating 144 fall on a point P3 on the first diffraction grating 142. Then, the first-order diffracted light L10 and the first-order diffracted light L11 coming from the second diffraction grating 144 are multiplexed by the first diffraction grating 142, and made to go out as interfering lights. At this time, a diffracted light that is diffracted or transmitted toward the same side as the incidence direction of the first-order diffracted light L10 coming from the second diffraction grating 144 is referred to as a diffracted light L12, while a diffracted light that is diffracted or transmitted toward the same side as the incidence direction of the first-order diffracted light L11 coming from the second diffraction grating 144 is referred to as a diffracted light L13.

The diffracted light L12 and the diffracted light L13 have their phase differentiated by 90 degrees by the retardation films 133A, 133B, and are received by the photodetectors 132A, 132B, respectively.

Under the configuration in which lights are received by the photodetectors 132A, 132B after traveling above-described optical paths, when the main scale 110 is made to slide, the diffraction grating 111 of the main scale 110 is moved. Then, phases of the diffracted lights are changed, and consequently, interfering sinusoidal wave signals output from the photodetectors 132A, 132B are changed.

Then, interfering sinusoidal wave signals output from the photodetectors 132A, 132B are processed by a signal processing unit, not shown. For example, interfering sinusoidal wave signals output from the photodetectors 132A, 132B undergo differential amplification to be multiplexed as a Lissajous figure, and the relative shift amount of the main scale 110 is detected using the motion state of the Lissajous figure.

According to thus configured first embodiment, following effects can be achieved.

(1) Lights which are transmitted through the second diffraction grating 144 and made to fall on the main scale 110 are reflected by the third diffraction grating 145 to be returned to the main scale 110. That is, the lights are reflected and diffracted by the main scale 110 twice. Accordingly, the lights to be received by the photodetectors 132A, 132B have quadruple phase information as compared with lights reflected and diffracted by the main scale 110 once. As a result, using interfering sinusoidal wave signals output from the photodetectors 132A, 132B, displacement of the main scale 110 can be detected with quadruple resolution.

(2) Since the first-order diffracted light L1 and the transmitted light L0 split by the first diffraction grating 142 indicate phase changes which are opposite to each other depending on the shift direction of the main scale 110, information of shift direction of the main scale 110 can be obtained from lights received by the photodetectors 132A, 132B.

(3) When splitting a light into two lights and returning lights to the main scale 110, plural optical devices provided with the function of beam splitting and mirroring are required. On the other hand, such function can be achieved by using two optical devices, that is, the first diffraction scale 141 and the second diffraction scale 143. Thus, the number of optical devices can be reduced, which can reduce the component cost as well as assembly cost. Furthermore, since the number of optical devices is small, it becomes easy to adjust optical paths and detection errors due to failure in optical path adjustment are reduced, which can improve detection accuracy.

(4) Other than the main scale 110, only the first diffraction scale 141 and the second diffraction scale 143 are required as optical devices, and a small number of optical components can downsize the entire configuration. Consequently, the entire optical paths can be shortened. Since interfering wave of a laser light fluctuates due to variation of atmospheric density, the displacement detection apparatus 100 becomes excellent in environmental resistance when optical paths are shortened.

(5) The third diffraction grating 145 is formed by metalizing the second diffraction scale 143 with a metal film. Thus, the third diffraction grating 145 can be formed easily. Being integrally formed with the second diffraction scale 143, the number of optical components can be reduced. It is difficult to work a metal plate to accurately form grooves thereon as a phase grating. On the other hand, a reflection type diffraction grating of high accuracy can be obtained by employing a simple manner of metalizing the phase grating of the second diffraction grating 144 with a metal film.

(6) Being exposed to outside, there is a fear that the metal film 146 configuring the third diffraction grating 145 may be eroded or exfoliated. On the other hand, the metal film 146 is covered by the second diffraction scale 143 and the first diffraction scale 141, and is not exposed to outside. Thus, the metal film 146 is protected and the endurance can be improved. Even though the surface of the metal film 146 is eroded, since one surface of the second diffraction grating 144 viewed from the side of the main scale 110 functions as a phase grating, the eroded surface of the metal film 146 does not affect optical performance.

Second Embodiment

Next, the second embodiment of the apparatus for detecting displacement according to the present invention will be explained.

The basic configuration of the second embodiment is similar to that of the first embodiment. In the second embodiment, the optical device unit has only one diffraction scale.

Figure 5:
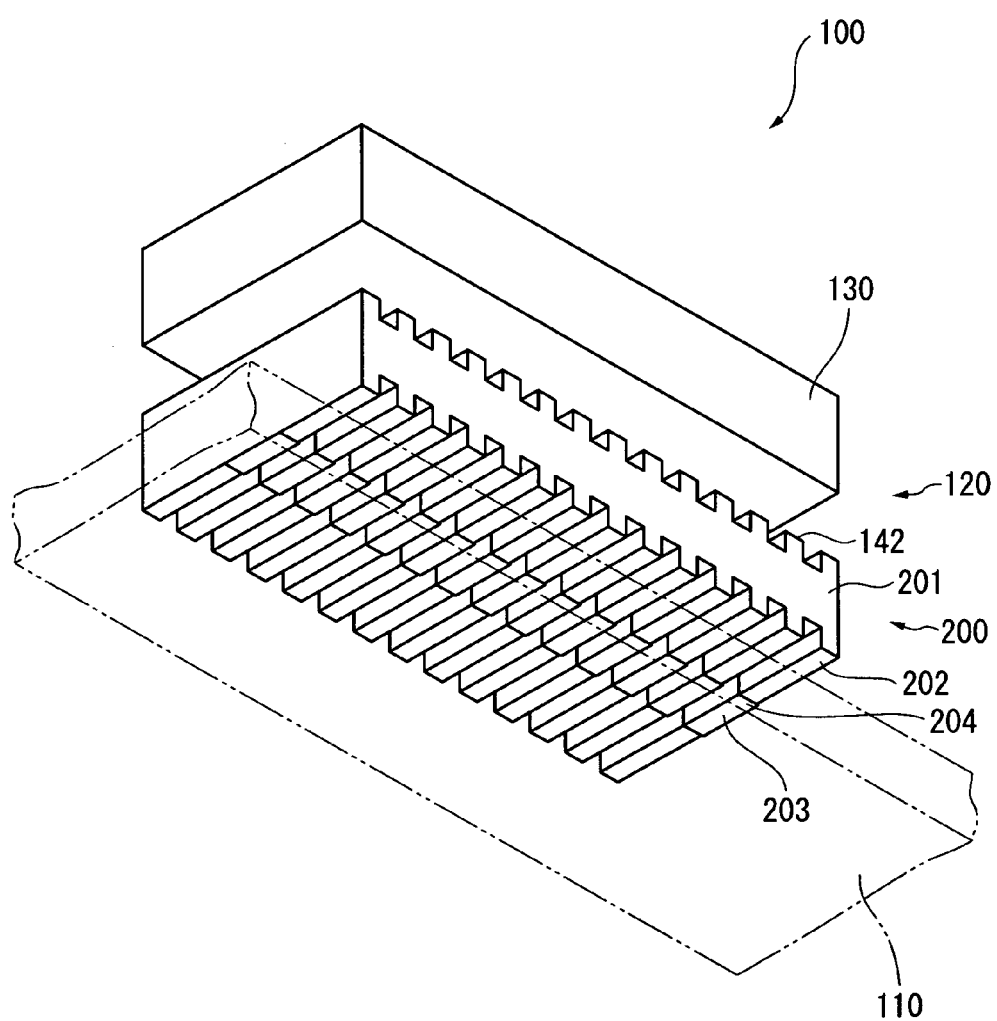
FIG. 5 shows a perspective view of the displacement detection apparatus according to the second embodiment of the present invention.

FIG. 5 shows a perspective view of the second embodiment of the displacement detection apparatus 100, in which an optical device unit 200 is arranged between the light emission/reception unit 130 and the main scale 110.

As shown in FIG. 5, the optical device unit 200 has a single diffraction scale 201. The diffraction scale 201 is arranged between the light emission/reception unit 130 and the main scale 110 in parallel with the main scale 110. The diffraction scale 201 is of flat rectangular solid shape and is made of transparent material such as glass.

The diffraction scale 201 has its one surface, facing the light emission/reception unit 130, provided with the first diffraction grating 142. The diffraction scale 201 has its other surface, facing the main scale 110, provided with the second diffraction grating 202. The diffraction scale 201 has its surface, facing the main scale 110, metalized with a metal film 204 extending along the longitudinal direction at its center portion along the width direction. The metal film 204 has its surface formed into grooved configuration similar to that of the second diffraction grating 202, and the metal film 204 configures a reflection type third diffraction grating 203.

In thus configured second embodiment, a light emitted from the light source 131 travels along the same optical paths as those of the first embodiment, and thus directed lights are received by the photodetectors 132A, 132B to detect the relative shift amount of the main scale 110.

According to thus configured second embodiment, following effects can be achieved in addition to the effects (1), (2) brought about by the first embodiment.

(7) Since the optical device unit 200 has the single diffraction scale 201, the number of optical components can be extremely reduced. Accordingly, the component cost as well as assembly cost can be reduced. Furthermore, the adjustment of the optical paths at the time of assembly is very simplified.

(8) Since the number of optical components can be extremely reduced, the entire optical paths can be extremely shortened. Furthermore, since the optical device unit 200 has the single diffraction scale 201, substantially the entire optical paths are located within the device, and optical paths located in the air can be shortened. Accordingly, the displacement detection apparatus 100 becomes excellent in environmental resistance.

Being arranged on one surface of the diffraction scale 201 facing the main scale 110, there is a fear that metal film 204 may be exposed from the detection head 120. Therefore, the metal film 204 may be covered by a transparent protective film, or a housing may be arranged to block off the space between the main scale 110 and the detection head 120 from outside.

Third Embodiment

Figure 6:
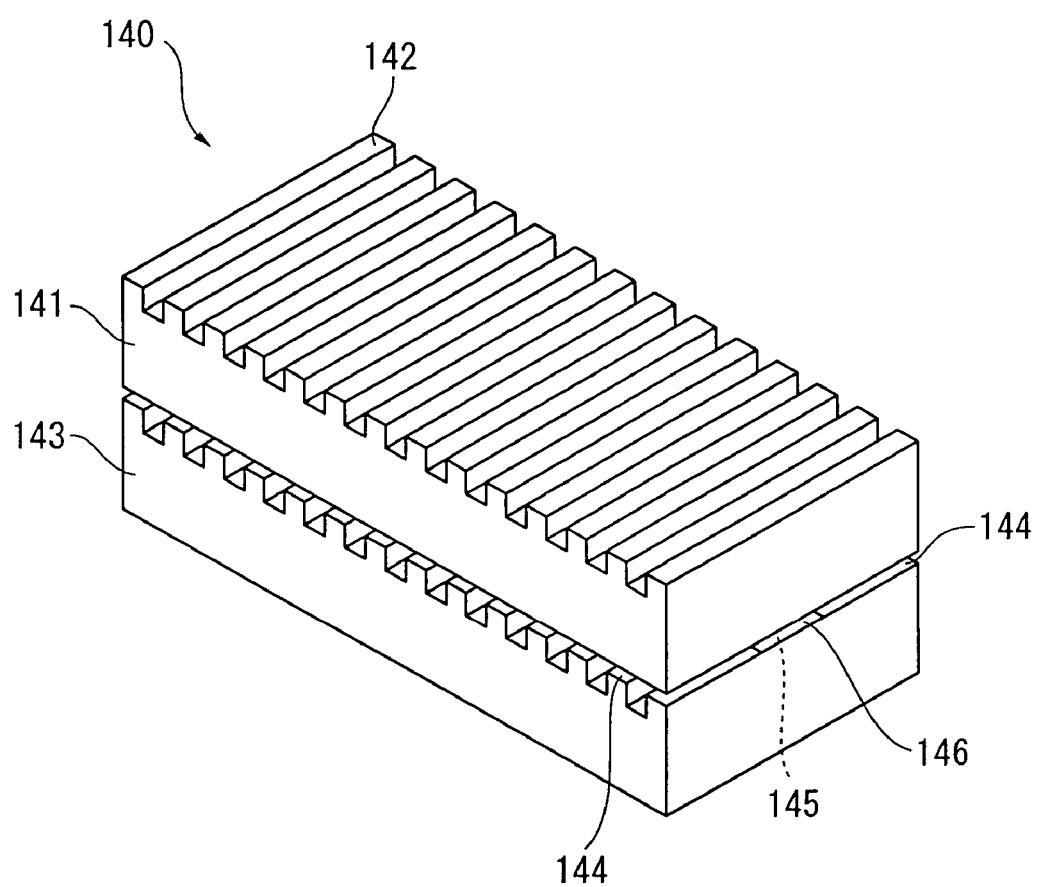
FIG. 6 shows a perspective view of an optical device unit of the displacement detection apparatus according to the third embodiment of the present invention.

Next, the third embodiment of the apparatus for detecting displacement according to the present invention will be explained with reference to FIG. 6.

The basic configuration of the third embodiment is similar to that of the first embodiment. In the third embodiment, the first diffraction scale 141 and the second diffraction scale 143 of the optical device unit 140 are made to be close to each other.

Since the second diffraction grating 144 has to diffract lights, a medium such as air whose refractive index is different from those of the first and second diffraction scales 141, 143 has to exist between the second diffraction grating 144 and the first diffraction scale 141. Otherwise, in case the first diffraction scale 141 and the second diffraction scale 143 are made of different materials whose refractive indexes are different from each other, the first diffraction scale 141 may abut on the second diffraction grating 144. In this case, the first diffraction scale 141 may abut on the metal film 146.

According to thus configured third embodiment, following effect can be achieved in addition to the effects (1) to (6) brought about by the above-described embodiments.

(9) Since the first diffraction scale 141 and the second diffraction scale 143 are made to get close to each other, the entire configuration can be downsized. Consequently, the entire optical paths can be shortened. Furthermore, substantially the entire optical paths are located within the device, and optical paths located in the air can be shortened. Accordingly, the displacement detection apparatus 100 becomes excellent in environmental resistance.

Fourth Embodiment

Figure 7:
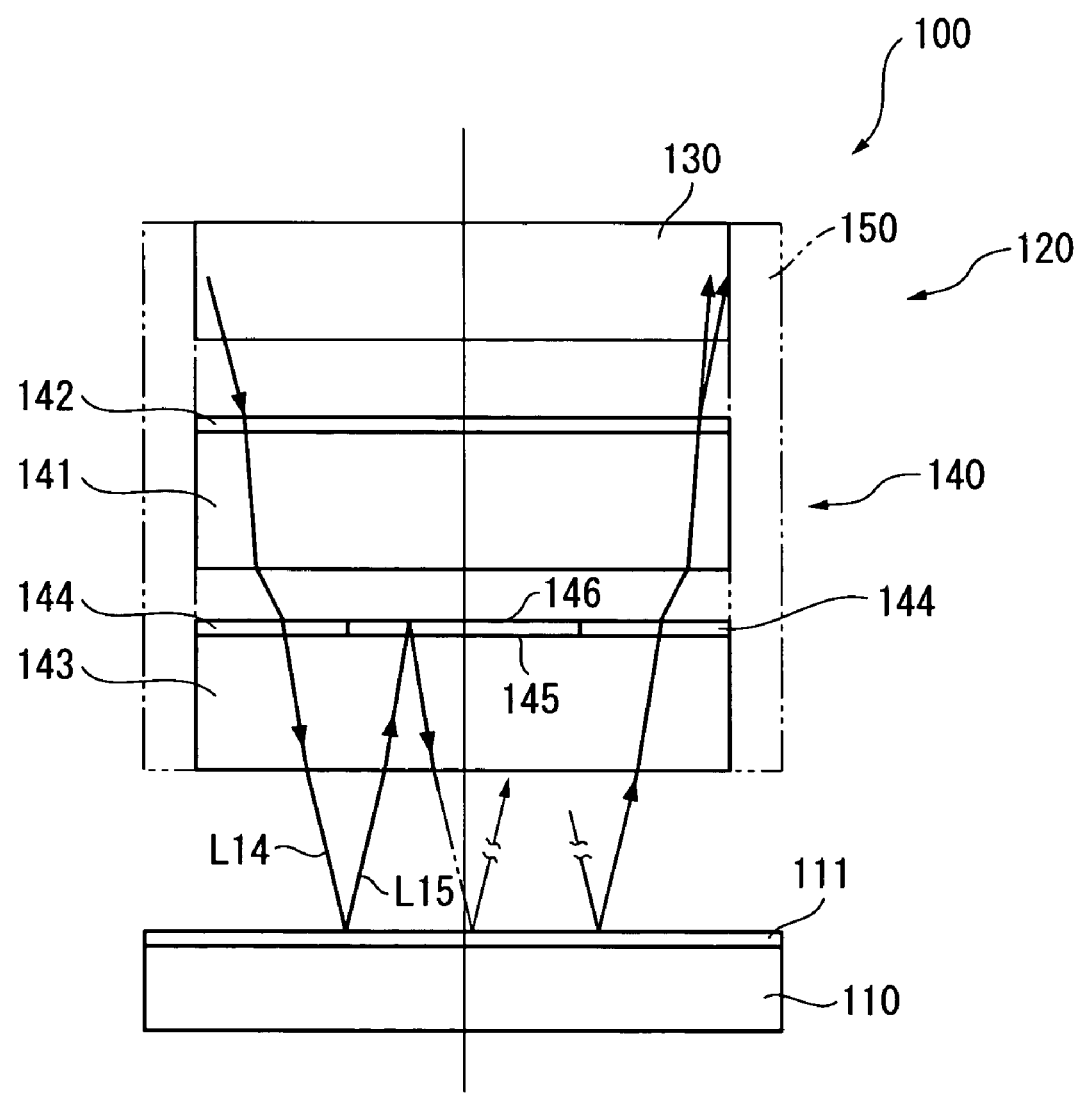
FIG. 7 shows a side view of the displacement detection apparatus according to the fourth embodiment of the present invention when viewed from the measurement direction and optical paths therein.

Next, the fourth embodiment of the apparatus for detecting displacement according to the present invention will be explained with reference to FIG. 7.

The basic configuration of the fourth embodiment is similar to that of the first embodiment. In the fourth embodiment, the width of the metal film is broadened. The metal film 146 may account for two-third part of the second diffraction scale 143 along the width direction (direction perpendicular to the length measurement direction).

Under the configuration, a light emitted from the light source 131 is split and deflected by the optical device unit 140, and is made to fall on the main scale 110 as diffracted lights L14. The diffracted lights L14 are reflected and diffracted by the main scale 110, and fall on the third diffraction grating 145 as diffracted lights L15. The diffracted lights L15 are reflected and diffracted by the third diffraction grating 145, and are made to fall on the main scale 110. And the lights are reflected and diffracted by the main scale 110 and the third diffraction grating 145 plural times, and pass through the second diffraction grating 144 and the first diffraction grating 142 from the main scale 110 to be received by the photodetectors 132A, 132B.

According to thus configured fourth embodiment, following effect can be achieved in addition to the effects (1) to (6) brought about by the above-described embodiments.

(10) Since the width of the metal film 146 is broadened, the number of return times of the lights onto the main scale 110 is increased. Accordingly, the lights to be received by the photodetectors 132A, 132B have several fold phase information as compared with lights that are reflected and diffracted by the main scale 110 once. As a result, resolution in detecting the relative shift amount of the main scale 110 can be improved. By employing the simple manner of broadening the width of the metal film 146, the number of reflection times on the third diffraction grating 145 is increased and detection resolution can be extremely improved.

The width of the metal film 146 is not restricted, and may be further broadened so long as the second diffraction grating 144 exists on the second diffraction scale 143.

Fifth Embodiment

Figure 8:
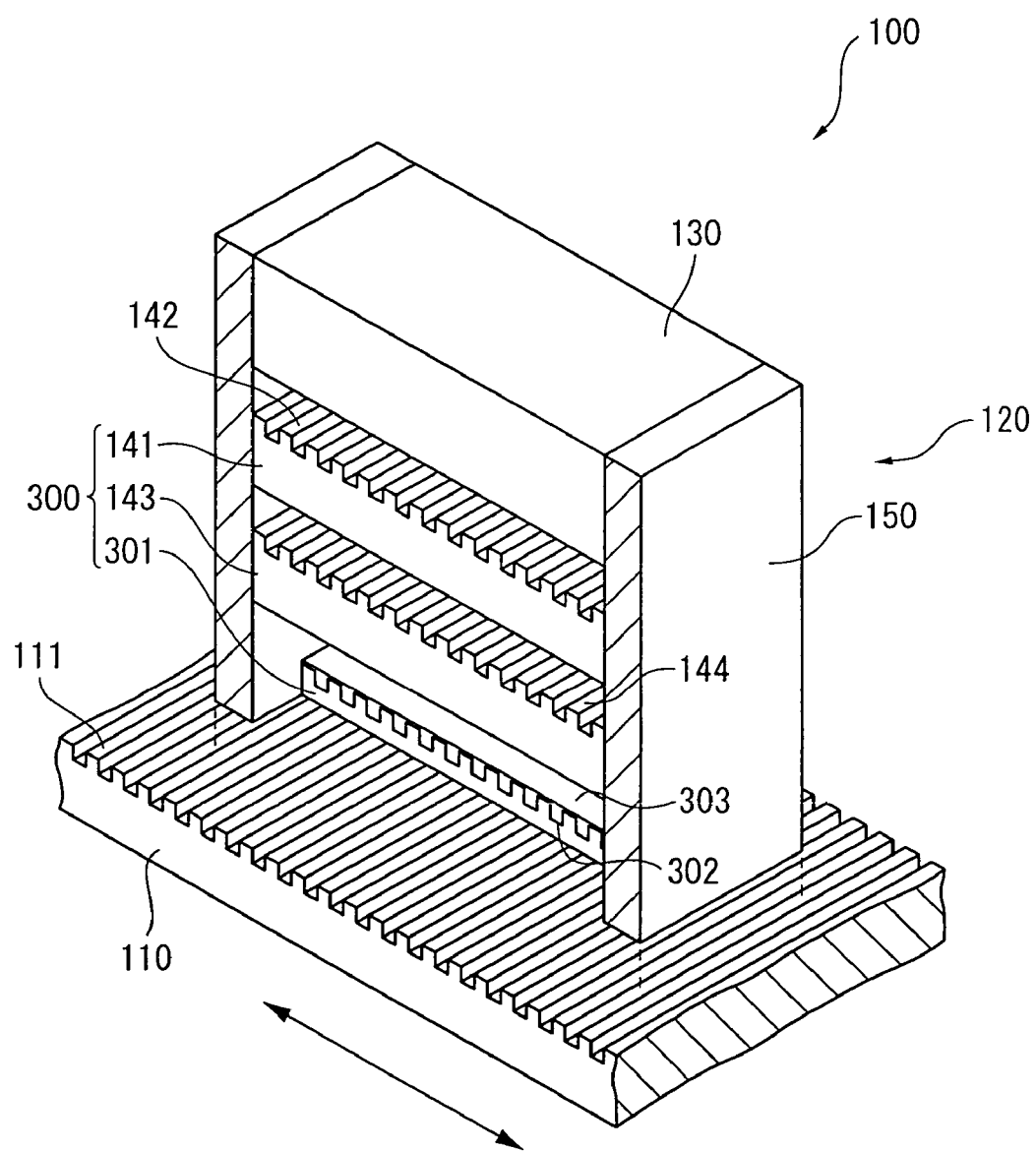
FIG. 8 shows a perspective view of the displacement detection apparatus according to the fifth embodiment of the present invention.

Next, the fifth embodiment of the apparatus for detecting displacement according to the present invention will be explained with reference to FIG. 8.

The basic configuration of the fifth embodiment is similar to that of the first embodiment. In the fifth embodiment, the optical device unit 300 further has a third diffraction scale 301.

That is, the optical device unit 300 has the first diffraction scale 141, the second diffraction scale 143, and the third diffraction scale 301.

The first diffraction scale 141, whose configuration is similar to that described in the first embodiment, has the first diffraction grating 142. The second diffraction scale 143 has the second diffraction grating 144, as described above in the first embodiment, while is not metalized with a metal film.

The third diffraction scale 301 is arranged between the second diffraction scale 143 and the main scale 110 substantially in parallel with the main scale 110. The third diffraction scale 301 is of flat rectangular solid shape with its width narrowed as compared with the first diffraction scale 141 and the second diffraction scale 143. The third diffraction scale 301 has its one surface, facing the second diffraction scale 143, provided with a phase grating as well as metalized with a metal film 303. Since the phase grating is metalized with the metal film 303, a reflection type third diffraction grating 302 is configured.

In thus configured fifth embodiment, a light emitted from the light source 131 travels along the same optical paths as those of the first embodiment, and thus directed lights are received by the photodetectors 132A, 132B to detect the relative shift amount of the main scale 110.

According to thus configured fifth embodiment, following effect can be achieved in addition to the effects (1), (2) brought about by the above-described embodiments.

(11) Since the third diffraction scale 301 is arranged separately from the second diffraction scale 143, and the third diffraction scale 301 is arranged on the side of the main scale 110, the third diffraction grating 302 can be made to get close to the main scale 110. Consequently, the entire optical paths can be shortened. Since interfering wave of a laser light fluctuates due to variation of atmospheric density, the displacement detection apparatus 100 becomes excellent in environmental resistance when optical paths are shortened.

Sixth Embodiment

Next, the sixth embodiment of the apparatus for detecting displacement according to the present invention will be explained with reference to FIG. 9.

The basic configuration of the sixth embodiment is similar to that of the first embodiment. In the sixth embodiment, along the width direction perpendicular to the length measurement direction, there is provided a prism (optical refracting section) onto which lights coming from the second diffraction grating or the third diffraction grating fall, and from which the lights go out toward the main scale with the refraction angles enlarged as compared with the incident angles.

Figure 9:
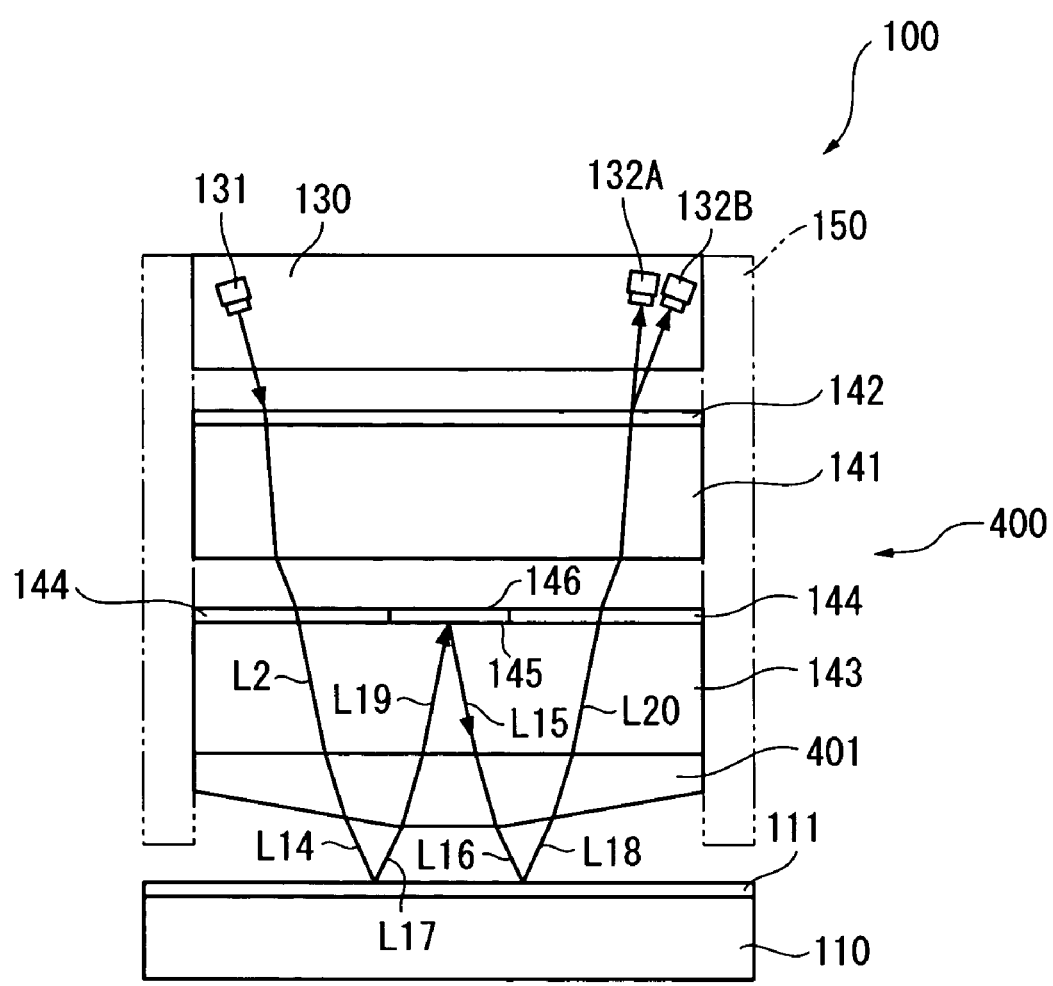
FIG. 9 shows a side view of the displacement detection apparatus according to the sixth embodiment of the present invention when viewed from the measurement direction and optical paths therein.

As shown in FIG. 9, the optical device unit 400 has a prism 401 in addition to the first diffraction scale 141 and the second diffraction scale 143.

The prism 401 is arranged on one surface of the second diffraction scale 143 facing the main scale 110. The thickness of the prism 401 is largest substantially at the center thereof along the width direction perpendicular to the length measurement direction, and is linearly reduced when getting close to both sides.

When the light L2 emitted from the light source 131 and diffracted by the second diffraction grating 144 comes into the prism 401, an outgoing light L14 goes out from the prism 401 toward the main scale 110. At this time, the refraction angle of the outgoing light L14 from the prism 401 is larger than the incident angle of the light L2 coming into the prism 401.

Similarly, when a light L15, which is diffracted and reflected by the third diffraction grating 145, goes out from the prism 401 as an outgoing light L16, the refraction angle becomes large.

On the other hand, when a light L17 and a light L18, which are diffracted and reflected by the main scale 110, come into the prism 401, the refraction angles of an outgoing light L19 and an outgoing light L20 from the prism 401 become small.

According to thus configured sixth embodiment, following effect can be achieved in addition to the effects brought about by the above-described embodiments.

(12) Since a light falls on the main scale 110 through the prism 401 with the refraction angle made larger than the incident angle, the emission direction along which the light source 131 emits a light to the first diffraction scale 141 is made close to a vertical direction. Accordingly, the length of the displacement detection apparatus 100 along the width direction can be reduced.

In case the light source 131 emits a light along substantially the vertical direction without the prism 401, since the light is reflected vertically from the main scale 110, the light emitted from the light source 131 and the light reflected by the main scale 110 overlap with each other. As a result, the light reflected by the main scale 110 cannot fall on the third diffraction grating 145, and the lights reflected by the main scale 110 can hardly be received by the photodetectors 132A, 132B.

In the sixth embodiment, since the optical device unit 400 has the prism 401, even though the light source 131 emits a light along substantially the vertical direction, the refraction angle of the light going out from the prism 401 is made large, and thus the incident angle of the light falling on the main scale 110 is enlarged. Accordingly, the light reflected by the main scale 110 can be made to fall on the third diffraction grating 145 along an optical path different from that of the light from the light source 131, and the lights reflected by the main scale 110 can be received by the photodetectors 132A, 132B. Since the light source 131 can emit a light along substantially the vertical direction, the width of the second diffraction grating 144 can be narrowed to approximately the length of the beam diameter of the laser light, which can reduce the length of the displacement detection apparatus 100 along the width direction. Since the length along the width direction is reduced, the displacement detection apparatus 100 can be downsized and the entire optical paths can be shortened. As a result, the displacement detection apparatus 100 becomes excellent in environmental resistance.

Seventh Embodiment

Next, the seventh embodiment of the apparatus for detecting displacement according to the present invention will be explained with reference to FIG. 10.

The basic configuration of the seventh embodiment is similar to that of the first embodiment. In the seventh embodiment, there is provided a reflection member 501 that reflects the lights reflected by the main scale 110 and diffracted by the first diffraction scale 141 to the side where the light source 131 is arranged.

Figure 10:
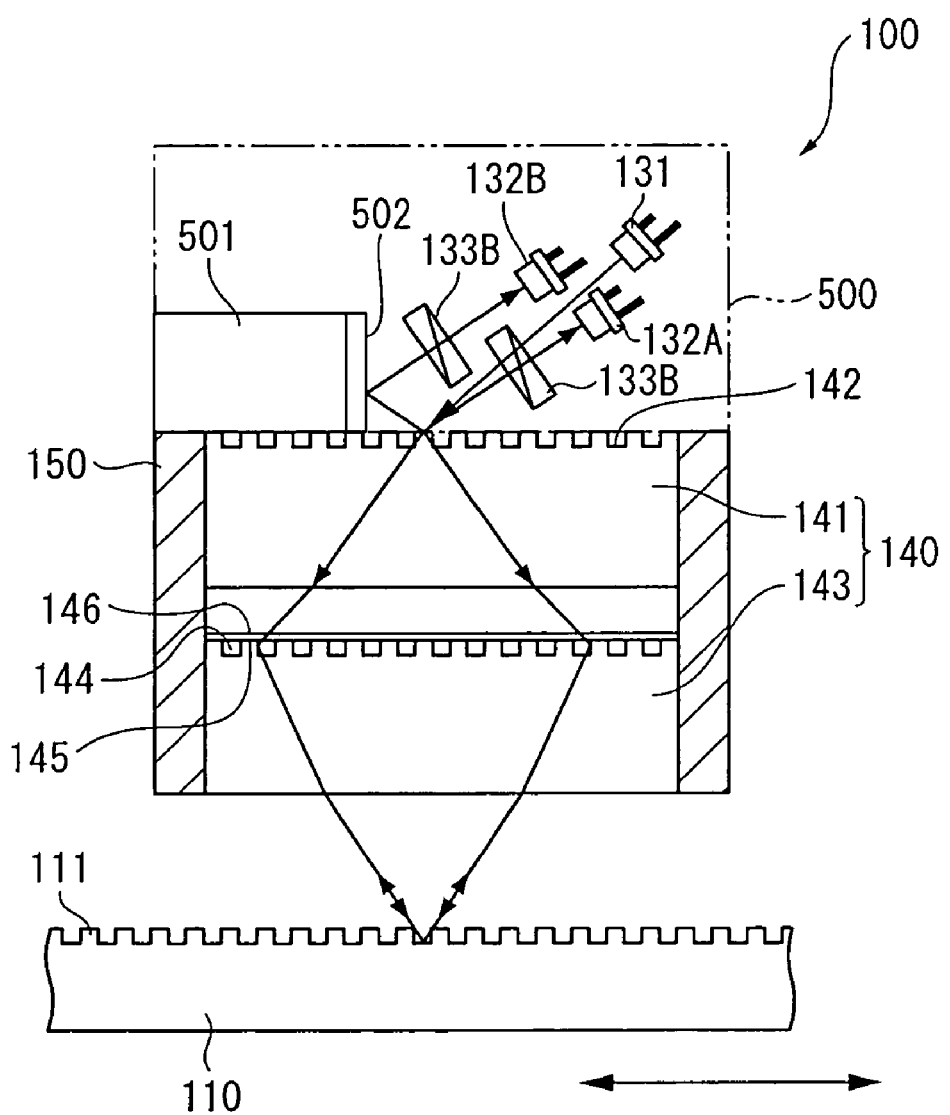
FIG. 10 shows a front view of the displacement detection apparatus according to the seventh embodiment of the present invention when viewed from the direction perpendicular to the measurement direction and optical paths therein.
Figure 11:
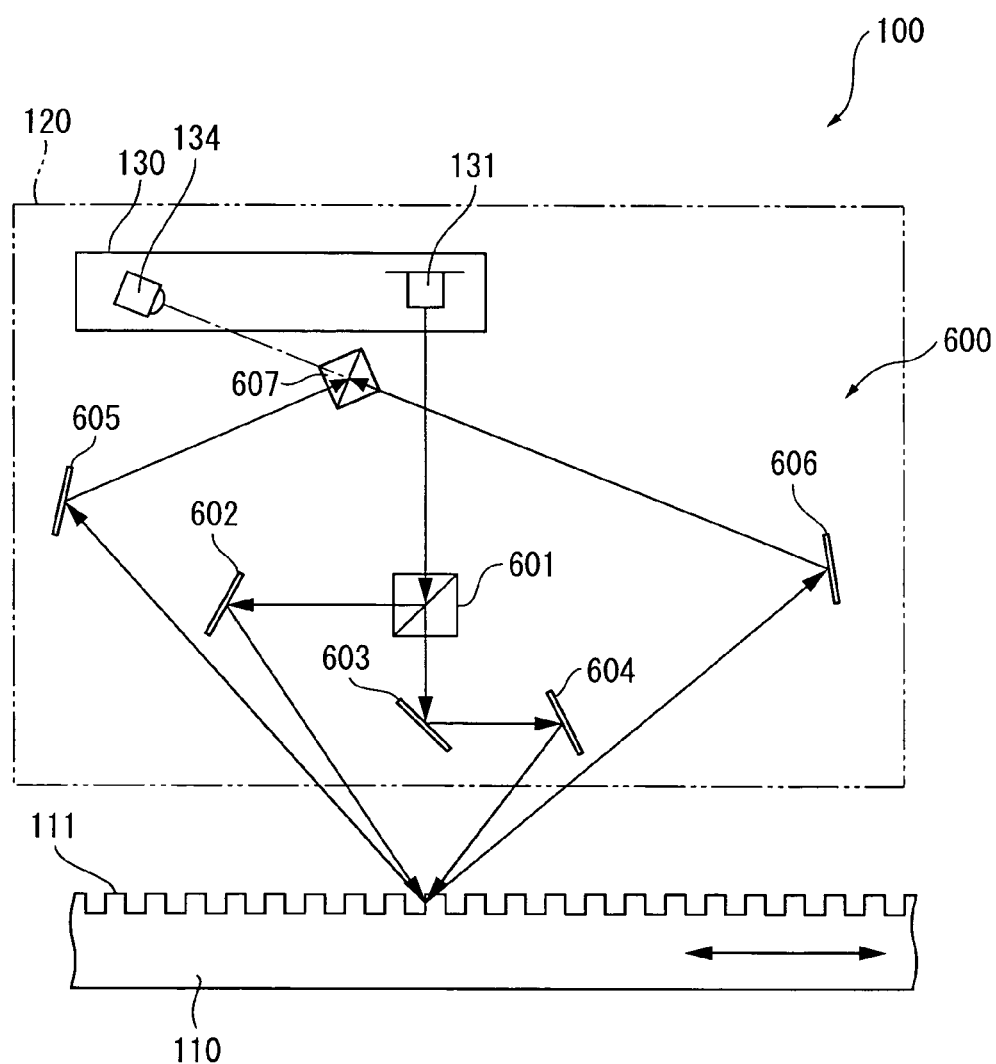
FIG. 11 shows the configuration of a conventional displacement detection apparatus.

As shown in FIG. 10, a light emission/reception unit 500 has the reflection member 501 in addition to the light source 131, photodetectors 132A, 132B, and retardation films 133A, 133B. The reflection member 501 has a reflection surface 502 arranged perpendicularly to the grating surface of the first diffraction grating 142 of the first diffraction scale 141 along the width direction thereof. The reflection surface 502 faces the light source 131.

The photodetectors 132A, 132B are both arranged on the side of the light source 131, and one of the photodetectors or the photodetector 132A directly receives the diffracted light from the first diffraction grating 142, while the other or the photodetector 132B receives the diffracted light that goes out from the first diffraction grating 142 and is reflected by the reflection surface 502.

When the lights reflected by the main scale 110 are diffracted by the first diffraction grating 142, there are brought about two diffracted lights or a diffracted light directed to the side of the light source 131 and a diffracted light directed to the side opposite to the side of the light source 131, as shown in FIG. 2 of the first embodiment.

Under the configuration of the seventh embodiment, the diffracted light directed to the side of the light source 131 is directly received by the photodetector 132A, while the diffracted light directed to the side opposite to the side of the light source 131 is received by the photodetector 132B after being reflected by the reflection surface 502.

According to thus configured seventh embodiment, following effect can be achieved in addition to the effects (1) to (6) brought about by the above-described embodiments.

(13) Since the reflection member 501 is provided, the light is reflected toward the light source 131. As a result, the light source 131 and the two photodetectors 132A, 132B are arranged on the same side, which can arrange the optical components for emitting and receiving lights in a single region. Specifically, since the photodetectors 132A, 132B are arranged on the same side, wires for sending signals output from the photodetectors 132A, 132B to a signal processing unit can be shortened.

While the present invention has been described in accordance with certain preferred embodiments, it should be understood by those ordinarily skilled in the art that the present invention is not limited to the embodiments, but various modifications, alternative constructions or equivalents can be implemented without departing from the scope and spirit of the present invention.

For example, in the embodiments, the main scale 110 has the reflection type diffraction grating 111, while the diffraction grating of the main scale 110 may be of transmission type. In this case, the third diffraction grating (diffraction grating for reemitting light) is arranged on the side opposite to the side of the light emission/reception unit 130 on the basis of the main scale 110.

In the embodiments, the detection head 120 is fixed and the main scale 110 is shifted. On the other hand, the main scale 110 may be fixed, in which case the detection head 120 is shifted.

The figuration of the diffraction gratings may be of square waveform type, sinusoidal waveform type, or triangular waveform type, and is not restricted. The diffraction gratings are not restricted to those having the concavo-convex relief on the surface thereof and may be phase gratings in which refractive index inside a medium changes periodically.

In the embodiments, of split lights that are split by the first diffraction grating (diffraction grating for splitting light, multiplexing section) 142, the zero-order diffracted light and the minus first-order diffracted light are used. On the other hand, if diffracted lights of any order may be used, it is possible to detect an interfering light so long as the light of the light source 131 is coherent light. Therefore, the order of diffracted lights to be used is not restricted.

The priority application Number JP2003-385055 upon which this patent application is based is hereby incorporated by reference.

What is claimed is:
1. A displacement detection apparatus, comprising:
a main scale having a main diffraction grating; and
a detection head adapted to move relative to the main scale, the detection head detecting a displacement amount relative to the main scale,
the detection head comprises:
a light emission/reception unit that has a light source emitting coherent light, and photodetectors receiving light diffracted by the main scale;
a first diffraction grating that diffracts and splits the light from the light source into at least two diffracted light beams of different orders;

a second diffraction grating that diffracts and deflects the light beams diffracted by the first diffraction grating such that the light beams are projected on a first spot of the main scale;

a third diffraction grating that diffracts and reflects the diffracted light beams from the first spot of the main scale such that the light beams are projected a second time onto a second spot of the main scale; and a multiplexing section that multiplexes the diffracted light beams from the second spot of the main scale, such that the multiplexed light beams interfere with each other.

2. The displacement detection apparatus according to claim 1, wherein the detection head has a first diffraction scale including a light transmitting diffraction grating, the first diffraction scale being provided between the light emission/reception unit and the second diffraction grating, and the diffraction grating of the first diffraction scale is the first diffraction grating that splits the light from the light source while the diffraction grating of the first diffraction scale is also the multiplexing section that multiplexes the diffracted light beams from the main scale.

3. The displacement detection apparatus according to claim 1, wherein the detection head has a light transmitting second diffraction scale, the light beams from the first diffraction grating entering a first surface of the second diffraction scale while the light beams being diffracted and transmitted to the main scale from a second surface of the second diffraction scale, the first surface of the second diffraction scale facing the first diffraction grating side while the second surface of the second diffraction scale facing the main scale side, the second diffraction grating is arranged on the first surface side of the second diffraction scale, and the third diffraction grating is arranged on the first surface side of the second diffraction scale to cover a part of the second diffraction grating, the third diffraction grating including a reflection section that reflects the light beams entering the second surface of the second diffraction scale.

4. The displacement detection apparatus according to claim 1, wherein the main diffraction grating of the main scale is a light reflecting diffraction grating, the detection head has a diffraction scale including light transmitting diffraction gratings, the diffraction scale being arranged between the light emission/reception unit and the main scale, the diffraction gratings being provided on both first and second surfaces of the diffraction scale, the diffraction grating provided on the first surface of the diffraction scale is the first diffraction grating that splits the light from the light source while the diffraction grating provided on the first surface of the diffraction scale is also the multiplexing section that multiplexes the diffracted light beams from the main scale, the first surface of the diffraction scale facing the light emission/reception unit, the diffraction grating provided on the second surface of the diffraction scale is the second diffraction grating, the second surface of the diffraction scale facing the main scale side, and the third diffraction grating is arranged on a part of the second surface of the diffraction scale, the third diffraction grating being a light reflecting diffraction grating that diffracts the reflected and diffracted light beams from the main scale and reflects the diffracted light beams on the main scale.

5. The displacement detection apparatus according to claim 1, wherein the main diffracting grating of the main scale is a light reflecting diffraction grating, and the third diffraction grating diffracts the diffracted light beams from the main scale and reflects the diffracted light beams on the main scale, the diffracted light beams being diffracted and reflected between the main scale and the third diffraction grating more than one time.

6. The displacement detection apparatus according to claim 1, wherein longitudinal directions of the light emission/reception unit, the first diffraction grating, the second diffraction grating, and the third diffraction grating are arranged along a longitudinal direction of the main scale, and the detection head further includes an optical refracting section that refracts the light beams deflected by the second diffraction grating such that the light beams are directed toward the center line of the main scale along the longitudinal direction thereof, the optical refracting section being arranged between the second diffraction grating and the main scale.

7. The displacement detection apparatus according to claim 1, wherein the detection head has a reflection member that reflects the light beams multiplexed by the multiplexing section on the light source side, and the light source and the photodetectors are arranged on the same side together facing a reflecting surface of the reflecting member in the light emission/reception unit.

* * * * *